US005505740A

United States Patent [19]

Kong et al.

[11] Patent Number: 5,505,740

[45] Date of Patent: Apr. 9, 1996

[54] METHOD AND PRODUCT FOR ENHANCED BLEACHING WITH IN SITU PERACID FORMATION

[75] Inventors: Stephen B. Kong, Alameda; Dale S. Steichen, Byron; Steven D. Ratcliff, Antioch, all of Calif.

[73] Assignee: The Clorox Company, Oakland, Calif.

[21] Appl. No.: 119,506

[22] Filed: Sep. 9, 1993

Related U.S. Application Data

[63] Continuation of Ser. No. 958,447, Oct. 7, 1992, abandoned, which is a continuation of Ser. No. 816,857, Jan. 2, 1992, abandoned, which is a continuation of Ser. No. 348,673, May 4, 1989, abandoned.

[51] Int. Cl.[6] .......... D06L 3/02; C01B 3/00; C01B 15/04

[52] U.S. Cl. .......... 8/111; 252/186.38; 252/186.39; 252/186.31; 252/186.27

[58] Field of Search .......... 8/111; 252/186.38, 252/186.39, 186.31, 186.27

[56] References Cited

U.S. PATENT DOCUMENTS

| | | | |
|---|---|---|---|
| 3,925,234 | 12/1975 | Hachmann et al. | 252/186.38 |
| 4,064,062 | 12/1977 | Yurko | 252/99 |
| 4,100,095 | 7/1978 | Hutchins | 252/99 |
| 4,367,156 | 1/1983 | Diehl | 252/102 |
| 4,378,967 | 4/1983 | Yotsuya et al. | 8/111 |
| 4,391,724 | 7/1983 | Bacon | 252/90 |
| 4,412,934 | 11/1983 | Chung et al. | 252/186.38 |
| 4,483,778 | 11/1984 | Thompson et al. | 252/94 |
| 4,655,781 | 4/1987 | Hsieh et al. | 252/95 |
| 4,681,592 | 7/1987 | Hardy et al. | 252/95 |
| 4,735,740 | 4/1988 | Zielske | 252/95 |
| 4,778,618 | 10/1988 | Fong et al. | 252/186.23 |
| 4,988,363 | 1/1991 | Barnes | 8/111 |
| 5,269,962 | 12/1993 | Brodbeck et al. | 252/186.25 |

FOREIGN PATENT DOCUMENTS

| | | | |
|---|---|---|---|
| 0290081 | 11/1988 | European Pat. Off. | C11D 3/39 |
| 2194772 | 3/1974 | France | C11D 3/40 |
| 2335596 | 7/1977 | France | C11D 7/18 |
| 2364966 | 4/1978 | France | C11D 3/42 |
| 61-001637 | 5/1986 | Japan . | |
| 1-242698 | 12/1989 | Japan . | |
| 1401312 | 7/1975 | United Kingdom | D06L 3/02 |
| 1456592 | 11/1976 | United Kingdom | 252/186.39 |
| 1542907 | 3/1979 | United Kingdom . | |

OTHER PUBLICATIONS

European Search Report including patent abstracts.

R. E. Sparks "Encyclopedia of Chemical Technology", 3rd Ed., vol. 15, pp. 470, 471, 485, 493, 1981, John Wiley & Sons, New York, U.S.

*Primary Examiner*—Robert L. Stoll
*Assistant Examiner*—Joseph D. Anthony
*Attorney, Agent, or Firm*—John A. Bucher; Joel J. Hayashida

[57] ABSTRACT

A bleaching product and a method of removing soils from fabrics by contacting the fabrics in an aqueous wash solution with a product comprising a peracid precursor, a source of hydrogen peroxide and a source for delayed release of an acid into the wash solution to initially permit effective in situ formation of peracid, the acid thereafter reducing the pH of the wash solution for enhancing bleach performance of the peracid. The source of the acid may be included in the bleaching product, for example, as an acid of delayed solubility, an acid coated with a low solubility agent or an acid generating species, or independent of the bleaching product. The acid source is selected to be compatible with the peracid or precursor and adjuncts. The method for removing soils thus comprises contacting the fabrics in an aqueous solution with a peracid precursor and a source of hydrogen peroxide, initially raising the pH of the solution for effective in situ formation of peracid and then reducing the pH for enhancing bleach performance of the peracid.

5 Claims, 3 Drawing Sheets

METHOD AND PRODUCT FOR ENHANCED BLEACHING WITH IN SITU PERACID FORMATION

This is a continuation of application Ser. No. 07/958,447, filed Oct. 7, 1992, now abandoned, itself a continuation of Ser. No. 07/816,857, filed Jan. 2, 1992, now abandoned, itself a continuation of Ser. No. 07/348,673, filed May 4, 1989 now abandoned.

FIELD OF THE INVENTION

The present invention relates to a method and product with in situ formation of a peracid for bleaching and more particularly to a method and product for achieving enhanced bleaching with a peracid generated in situ within an aqueous wash solution. The peracid is typically formed by combination of a peracid precursor and a source of hydrogen peroxide combined, for example, in a bleach product which may optionally contain detergents and suitable adjuncts.

BACKGROUND OF THE INVENTION

It has long been known that hypochlorite bleaches and peroxygen bleaching compounds such as hydrogen peroxide, sodium percarbonate and sodium perborate monohydrate or tetrahydrate, for example, are useful in the bleaching of fabrics, textiles and other similar materials. Preformed peracid chemistry was subsequently developed and found to achieve enhanced bleaching action compared to the peroxygen bleaching compounds noted above.

More recently, peracid precursor or activated bleach chemistry has been developed as a further alternative bleaching composition. Generally, this chemistry involves the use of peracid precursors or activators in an aqueous solution for in situ generation of peracid.

A number of peracid precursors or bleach activator systems have been developed in the prior art. For example, representative systems have been disclosed by U.S. Pat. No. 4,283,301 issued Aug. 11, 1981 to Diehl and U.S. Pat. No. 4,412,934 issued Nov. 1, 1983 to Chung et al. Many other prior art references have also disclosed peracid precursor systems suitable for in situ generation of a peracid within an aqueous solution which may be a wash solution containing fabrics to be cleaned.

Techniques for enhancing bleach performance of preformed peracids have been disclosed by a number of prior art references. In particular, U.S. Pat. No. 4,391,725 issued Jul. 5, 1983 to Bossu disclosed and claimed a granular hydrophobic peroxyacid laundry product in the form of a preformed peracid bleach encased or permeated within a nonwoven fabric pouch. An acid additive, indicated as having a pKa of from about 2 to about 7, was combined with the hydrophobic peracid in the pouch in order to aid in release of the peracid from the pouch, thereby enhancing bleach performance. U.S. Pat. No. 4,473,507 issued Sep. 25, 1984 as a division from the above patent and related to similar subject matter. U.S. Pat. No. 4,391,723 issued Jul. 5, 1983 to Bacon and Bossu as well as U.S. Pat. No. 4,391,724 issued Jul. 5, 1983 to Bacon also related to similar subject matter and appeared to demonstrate advantages in the inclusion of boric acid or other acids together with the preformed peracids for improving bleach performance. British Patent Publication 1,456,592 disclosed the use of both acid and alkaline pH-adjustment agents together with preformed peroxyacid bleach materials for enhancing stain removal capabilities.

To the extent that the prior art references discussed above are of assistance in facilitating an understanding of the present invention, they are incorporated herein as though set forth in their entirety. However, none of the above preformed peracid references either disclosed or suggested bleaching methods or bleaching products including peracid precursors or activators for in situ generation of the peracid in aqueous wash water.

At the same time because of the advantages of peracid precursors as noted above, it has been found desirable to further enhance bleaching performance of such systems in order to make them even more effective and/or efficient.

SUMMARY OF THE INVENTION

It is therefore an object of the invention to provide a method and product for bleaching fabrics in an aqueous wash solution with a peracid precursor or activator and a source of hydrogen peroxide for in situ formation of a peracid wherein the pH of the wash solution is lowered to a selected level following formation of a substantial portion of the peracid in order to enhance bleaching performance of the peracid. Preferably, the aqueous wash solution is initially raised to a relatively high pH level, for example, by introduction of an alkaline agent, for initially enhancing production of the peracid in the aqueous solution, the pH of the aqueous solution thereafter being reduced for enhancing bleach performance.

The reduction of pH in the aqueous solution can be accomplished either by introduction or injection of an acid agent from an external source, by effective release of an acid already within the aqueous solution or by in situ generation of acid with the aqueous solution for the same purpose. In any event, the invention contemplates the delayed release or effective introduction of an acid agent into the aqueous wash solution after an initial period of time selected for allowing substantial in situ formation of a peracid bleaching agent in the aqueous wash solution.

Further precursors or activators of the type contemplated by the present invention are capable of generating maximum yield (active oxygen) over a relatively wide variety of times. For example, certain precursors discussed in the following description generate maximum yield after about 4 minutes. However, other precursors may generate maximum yield after longer periods or shorter periods such as 1 minute or even in as short a time as 30 seconds or less, depending primarily on peroxide concentration and solution pH.

The purpose of the delayed release or formation of an acid agent within the aqueous wash solution is to reduce or adjust the pH of the aqueous solution or medium so that the peracid is more capable of enhanced bleaching action.

Accordingly, in view of the time for generating maximum peracid yield, the invention preferably contemplates a time period for delayed acid release or formation of about one half or one to five minutes, more preferably about two to five minutes and most preferably about three to five minutes.

The formation of peracid bleaching agents by in situ perhydrolysis is optimized or facilitated in an aqueous solution at a relatively high or alkaline pH level. However, the resulting peracid bleaching agents tend to provide optimum or maximum bleaching performance at a relatively lower pH.

In a typical wash or bleach application, perhydrolysis (achieving in situ formation of peracids) commonly takes place in combination with a detergent or other alkaline agent which raises the pH of the wash solution. Although formation of the peracid is promoted, the higher pH results in lower bleach performance.

In any event, it is a particular object of the present invention to initially provide a high pH in the wash solution to promote peracid generation from perhydrolysis followed by a lowering of the wash solution pH to maximize or enhance bleaching performance of the generated peracid.

It is another object of the invention to provide a bleaching product and a method for removing soil from fabric by contacting the fabric in an aqueous wash solution with a bleaching product including a peracid precursor and hydrogen peroxide source suitable for in situ formation of a bleach effective amount of peracid in the aqueous solution and a source for effectively releasing an acid agent into the aqueous solution after substantial formation of the peracid in order to reduce the pH of the wash solution to a predetermined level selected for enhancing bleach performance of the peracid. Preferably, an alkaline agent is provided either in the bleaching product or directly in the aqueous solution for initially raising the pH of the wash solution to enhance formation of the peracid.

The means for effectively releasing the acid agent, as referred to above, may be either a source of acid external to the bleaching product and/or aqueous wash solution or an acid of delayed solubility or an acid precursor included within the bleaching product itself. An acid of delayed solubility may be an acid coated with a low solubility material, an acid encapsulated with or permeated into a medium regulating its release, an acid with a selected particle size for controlling its effective release into the aqueous solution or an organic compound having a chain length selected for a similar purpose, for example.

It is a still further object of the invention to provide a system for removing soils from fabrics wherein the fabrics are contacted in an aqueous solution with a bleach product including a peracid precursor and a hydrogen peroxide source suitable for in situ formation of a bleach effective amount of peracid. An acid agent is released into the aqueous wash solution after a predetermined period of time selected for allowing formation of a substantial amount of peracid, preferably, at least about 50 percent and more preferably about 80 percent of the possible peracid yield for the peracid precursor and hydrogen peroxide source, the amount and type of the acid agent being selected for then reducing the pH of the wash solution to a predetermined level for enhancing bleach performance of the peracid. Means for releasing the acid can be included in the bleach product or separate therefrom.

It is yet a further related object of the invention to provide a method for removing soils from fabrics wherein the fabrics are contacted in an aqueous solution with a bleaching product including a peracid precursor and a hydrogen peroxide source suitable for in situ formation of a bleach effective amount of peracid in the aqueous solution, the pH of the aqueous wash solution then being raised to a level and for a period of time selected for allowing formation of a substantial amount of peracid in the aqueous wash solution, for example, at least about 50 percent and preferably about 80 percent of the theoretical amount of peracid capable of formation by the peracid precursor and hydrogen peroxide source, thereafter effectively introducing into the wash solution an acid agent of an amount and type suitable for reducing the pH of the wash solution to a predetermined level for enhancing bleach performance of the peracid. Here again, the bleaching product preferably also includes an alkaline agent for initially raising the pH of the wash solution to an alkaline level suitable for enhancing formation of the peracid.

Additional objects and advantages of the invention are made apparent in the following description having reference to the accompanying drawings.

DESCRIPTION OF THE PREFERRED EMBODIMENTS

In summary, the present invention relates to a method and product for achieving enhanced bleaching in an aqueous wash water with in situ generation of peracid from a peracid precursor or activator system.

In both the method and product, the invention contemplates a bleaching product including the peracid precursor or activator system either in combination with a detergent product or as a bleach additive. Furthermore, the product may be either liquid or solid and can be contained in a variety of packages including bottles, cartons, pouches and other delivery means known to those skilled in the art.

Figure 1:
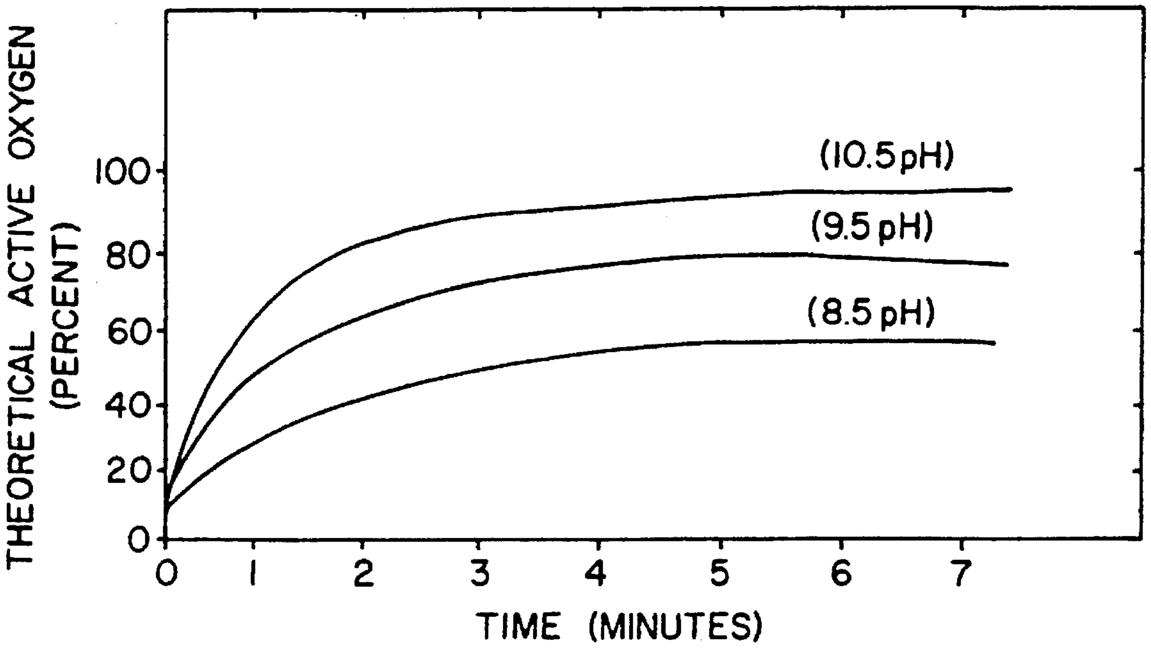
FIG. 1 is a graphical representation of active oxygen (peroxy acid) generated by perhydrolysis at different pH levels.

The basic concept of the invention is illustrated by the data graphically set forth in FIGS. 1–4. FIG. 1 demonstrates in situ formation (versus time) of a peracid from a peracid precursor or activator system described in greater detail below and for different pH levels of 8.5, 9.5 and 10.5 being maintained within an aqueous solution.

In any event, FIG. 1 demonstrates that optimum peracid formation occurs generally at pH greater than about 9.5, preferably about 10 to 11 and most preferably about 10.5. FIG. 1 further demonstrates that in situ peracid formation tends to take place within a time period of about 1 to 5 minutes but possibly in as little as 30 seconds.

Figure 2:
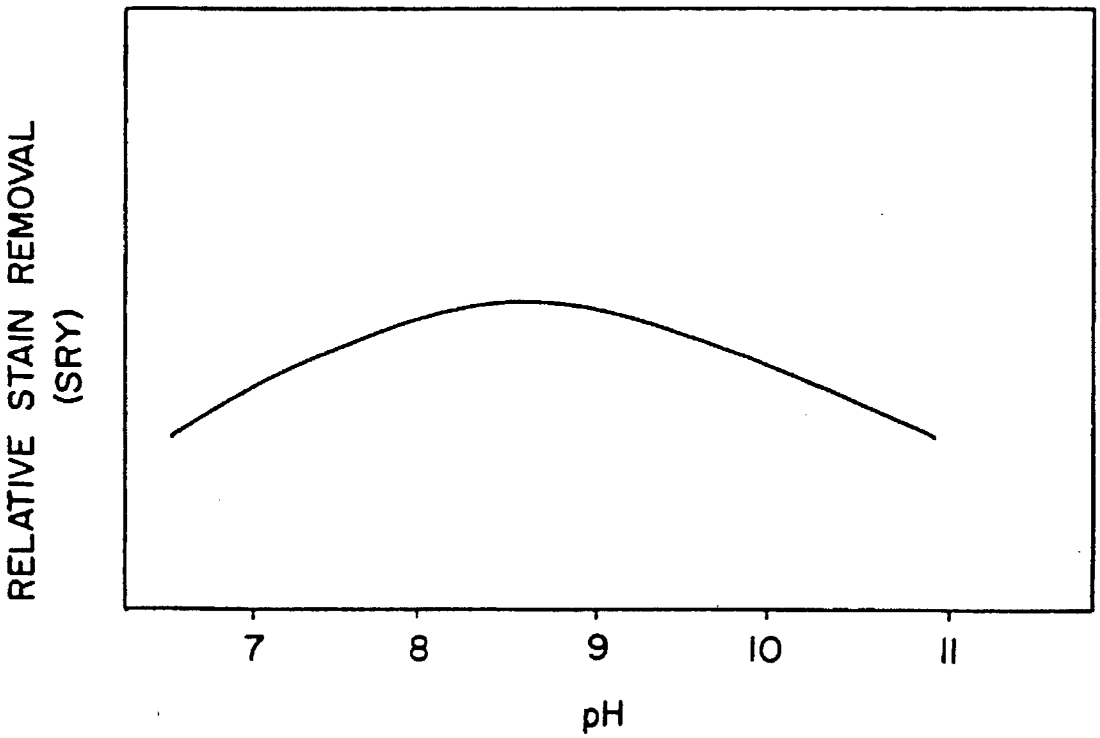
FIG. 2 is a graphical representation of stain removal employing a peracid at different pH levels.

FIG. 2 illustrates relative stain removal for fabrics in a typical wash solution containing a peracid bleach over a range of pH levels. It may be clearly seen from FIG. 2 that optimum stain removal or bleach performance tends to take place with a pH range of about 8 to 10, more preferably at about 8.5 to 9.8 and most preferably at a pH of about 8.5 to 9.3.

Referring to FIGS. 1 and 2 in combination, a relatively high or alkaline pH level is shown to be desirable in the aqueous or wash solution for facilitating or maximizing in situ peracid formation. This preferred high alkaline level is of course provided by many detergent products which could commonly be employed in wash solutions together with the peracid precursor system contemplated by the present invention. However, once in situ peracid formation is substantially complete, FIG. 2 demonstrates that bleaching can be optimized or enhanced at a lower or more acid pH level in the preferred range as noted above.

Thus, the high pH or alkaline condition developed by many detergents desirably promotes in situ peracid formation but thereafter tends to reduce the bleaching action of the peracid bleach. The conclusions set forth above in connection with FIGS. 1 and 2 are presented as a basis for the method and product of the present invention. An explanation of superior bleaching at lower pH levels can be found in U.S. Pat. No. 4,412,934 issued Nov. 1, 1983 to Chung et al.

Figure 3:
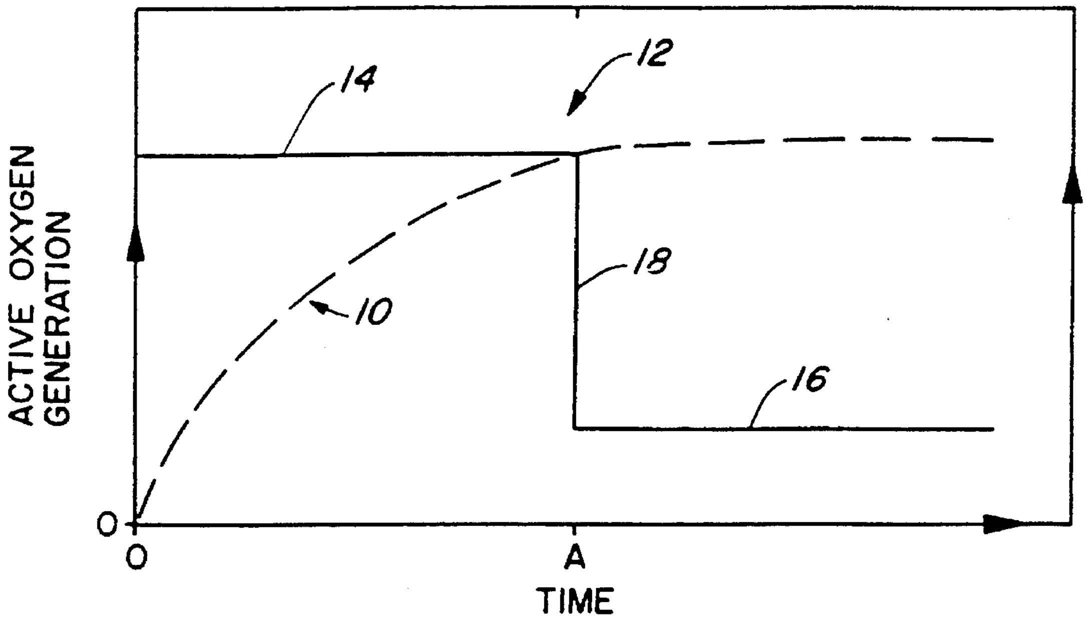
FIG. 3 is a graphical representation of peracid generation versus time with an idealized pH profile according to the present invention being shown as an overlay.
Figure 4:
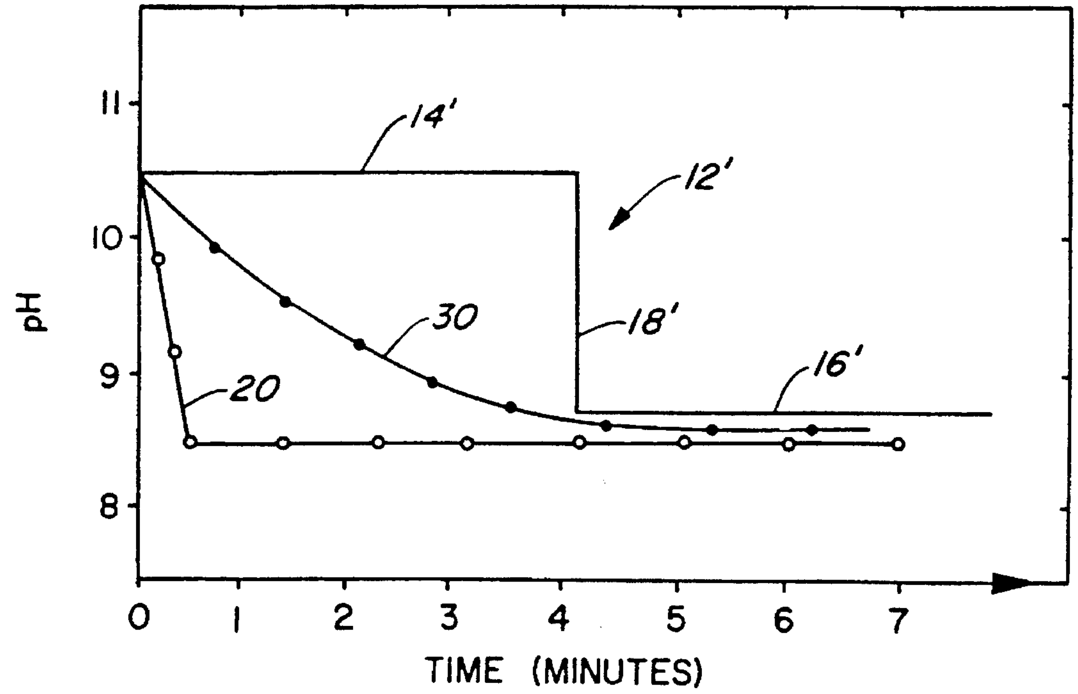
FIG. 4 is a graphical representation of pH adjustment for a bleach system employing in situ peracid formation according to the present invention.

Under conditions summarized above with reference to FIGS. 1 and 2, the present invention contemplates a method and product for enhanced bleaching with in situ generation of a peroxyacid or peracid bleaching product in the manner best illustrated in FIGS. 3 and 4. As indicated above, FIGS. 3 and 4 illustrate optimum pH conditions achieved within a typical wash cycle in an aqueous solution.

FIG. 3 includes a broken line 10 illustrating peracid generation (or production of active oxygen) versus time with generally maximum peracid generation occurring after a time designated A. A solid line trace 12 represents an idealized pH profile according to the present invention for a wash cycle wherein a relatively high pH of at least about 10 and more preferably at least 10.5 is initially maintained until substantial or maximum peracid generation as indicated at A. In other words, the relatively high pH condition is maintained for a period of time necessary to facilitate in situ formation of peracid in an amount representing at least about 50 percent, for example, and more preferably about 80 percent of the amount of peracid theoretically possible from the peracid precursor or activator system being employed. In FIG. 3, the initial high pH or alkaline portion of the trace 12 is indicated at 14.

After optimum in situ formation of peracid has taken place, as indicated at A in FIG. 3, the pH is reduced to a relatively lower or more acid condition of less than about pH 10, more preferably about 8.5 to 9.5 and most preferably about 8.5 to 9.3. The reduced pH level is indicated at 16 in FIG. 3 being interconnected with the initial pH level 14 by a transition line 18.

Referring momentarily to FIGS. 1 and 2, the relatively high pH level of the initial trace portion 14 corresponds with optimum in situ peracid formation as demonstrated in FIG. 1 while the lower or more acid pH level in the subsequent trace portion 16 corresponds with optimum bleach performance or stain removal ranges demonstrated in FIG. 2.

It is again noted that the trace 10 represents ideal conditions which may not actually be achieved with methods or products for carrying out the present invention. In particular, if the delayed acidification represented by the transition from trace level 14 to trace level 16 is initiated chemically by agents employed within a product also containing the peracid precursor or activator system, it will be difficult if not impossible to obtain the almost instantaneous pH change represented in the trace 12 by the transition generally indicated at 18. However, it is possible to closely approximate the ideal conditions of the trace 12 in normal wash cycles, particularly if an acid agent for developing the lower pH trace portion 16 is introduced separately from the bleach product, for example, by mechanical or manual injection.

An acid agent could be added to the wash cycle either manually or automatically by mechanical means after a suitable time period for achieving optimum or maximum in situ peracid formation. More specifically, it would be generally possible to closely approximate the ideal conditions of trace 10 by manually adding an appropriate amount of acid to the wash solution. Alternatively, a machine for carrying out the wash cycle could be equipped with an injector or the like for similarly injecting the acid agent into the wash solution at time A indicated in FIG. 3. A variety of mechanical or manual means for introduction of the acid agent are believed apparent from the preceding description so that no further description or illustration thereof is considered necessary for purposes of this invention.

FIG. 4 includes an idealized pH profile according to the invention and similar to that indicated at 12 in FIG. 3. In FIG. 4, the idealized pH profile is indicated at 12'. However, FIG. 4 is based upon a specific peracid precursor where it is assumed that optimum peracid or active oxygen generation occurs after approximately 4 minutes. Accordingly, in FIG. 4, an initial higher pH portion 14' of the trace 12' terminates at approximately 4 minutes with a lower pH level thereafter being indicated at 16' following a transition of 18'. As noted above, the idealized pH trace 12' of FIG. 4 generally approximates mechanical or manual injection of an effective acid into the wash cycle after approximately 4 minutes.

FIG. 4 also includes additional traces 20 and 30 representing other systems for carrying out the present invention, for example, where the acidification agent is a part of the bleach product itself. For example, as is described in greater detail below, the second trace 20 represents addition of an acid such as citric acid within the bleach product itself. As indicated in the trace 20, simple addition of citric acid results in the pH of the wash solution being rapidly reduced to approximately the same level as the lower pH trace 16'. Still another trace 30 represents addition of the same acid agent, citric acid, but coated with paraffin wax resulting in a more gradual reduction of pH in the wash solution toward the pH level indicated in the lower trace 16'. Thus, the three traces 12', 20 and 30 illustrated in FIG. 4 represent different techniques with different degrees of success in approaching the idealized pH profile of FIG. 3.

It is more specifically contemplated in connection with the present invention that the method and product for enhanced bleaching be carried out with acidification in situ or by means of an agent included with the product containing the peracid precursor or activator system itself. As will be described in greater detail below, delayed acidification may be carried out for example by means of an acid agent which is a component of the bleach product. The acid agent can demonstrate delayed solubility, for example, due to particle size of the acid agent or chain length of an organic compound forming the acid agent, or by an agent combined with the acid, for example, a suitable acid with a coating of delayed solubility. Furthermore, delayed acidification can also be achieved by means of a precursor system for achieving in situ formation of acid within the aqueous wash solution after the time period indicated in FIG. 3 or FIG. 4.

Thus, the concept of the present invention and the method and product for achieving enhanced bleaching with in situ peracid formation is believed to be clearly demonstrated by the preceding summary with reference to FIGS. 1–4. However, composition of a product contemplated by the invention or suitable for carrying out the method of the invention is described in greater detail below followed by examples further demonstrating one or more embodiments of the invention.

Bleach Product

A bleach product suitable for carrying out the method of the invention essentially includes a peracid precursor or activator system, usually a peracid precursor and hydrogen peroxide source, together with a delayed release acid agent or delayed acidification agent which can take any of the forms summarized above. In addition, the bleach product can include other normal adjuncts such as surfactants, coloring agents and the like. The product can either be a bleach additive for use with various detergent products or the bleach product itself may be combined with a detergent component to provide both detergency and bleaching within the wash solution by means of a single product.

These components of the bleach product ere discussed in greater detail immediately below followed by a number of examples to better demonstrate the invention.

The Peracid Precursor System

The peracid precursor or activator system contemplated for the method and product of the invention is generally one of a number of types which are well known in and of themselves in the prior art, for example, reference again made to the Chung patent discussed above.

In any event, the invention is based upon peracid or perhydrolysis chemistry as generally referred to in those references and also as dealt with at length in the prior art, for example, by Sheldon N. Lewis, in Chapter 5 entitled "Peracid and Peroxide Oxidations" of the publication entitled *Oxidation*, Volume 1 published by Marcel Dekker, Inc., New York, N.Y., 1969 (see pages 213–254). In order to avoid a detailed discussion of basic peracid and perhydrolysis chemistry, which is a necessary feature of the invention but which is believed to be fully developed in the prior art, that reference is also incorporated herein as though set forth in its entirety.

As was also noted above, the peracid precursor system includes both a peracid precursor and a source of hydrogen peroxide.

The peracid precursor, also known as a bleach activator, can be any of a variety of organic peracid-forming compounds disclosed in the art for use in conjunction with peroxide sources. Organic peracid precursors are typically compounds containing one or more acyl groups which are susceptible to perhydrolysis. Suitable activators are those of the N-acyl or O-acyl compound type containing an acyl radical R—CO— wherein R is an aliphatic group having from 5 to 18 carbon atoms, or alkylaryl of about 11 to 24 atoms, with 5 to 18 carbon atoms in the alkyl chain. If the radicals R are aliphatic, they preferably contain 5 to 18 carbon atoms and most preferably 5–12 carbon atoms.

These types of surface active activators provide surface active or hydrophobic peracids. Surface active peracids are generally classified as those peracids which, similar to surfactants, form micelles in aqueous media. See U.S. Pat. No. 4,655,781, of Hsieh et al, of common assignment and incorporated herein by reference. An alternative definition is hydrophobic peracid, which is defined as one "whose parent carboxylic acid has a measurable CMC (critical micelle concentration) of less than 0.5M." See European Published Application EP 68547 and U.S. Pat. No. 4,391,725, of Bossu, both of which are incorporated herein by reference.

Another way of defining appropriate activators is to describe the activators' acyl portion as being the acyl moiety of a carboxylic acid having a log $P_{oct}$ as the partition coefficient of the carboxylic acid between n-octanol and water at 21° C. This is described in A. Leo et al in *Chemical Reviews*, pp. 525–616 (1971) and in U.S. Pat. No. 4,536,314 of Hardy et al, at column 4, lines 20–27 and at lines 41–51, both of which are incorporated herein by reference.

Hydrotropic peracids are also desirable. These peracids are defined as those "whose parent carboxylic acid has no measurable CMC below 0.5M" as set for in EP 68547 and U.S. Pat. No. 4,391,725, of Bossu, both of which are incorporated herein by reference. An example of a bleach activator which can deliver a hydrotropic peracid is shown in Diehl, U.S. Pat. Nos. 4,283,301 and 4,367,156, namely:

wherein R' is a hydrocarbyl of 4–24 carbons, optionally ethoxylated, and each Z is a leaving group selected from enols, carbon acids and imidazoles.

Yet another example of a bleach activator which provides a hydrotropic peracid in aqueous solution is disclosed in U.S. Pat. No. 4,735,740, of Alfred G. Zielske, issued Apr. 5, 1988, entitled "DIPEROXY ACID PRECURSORS AND METHOD" and commonly assigned herein, in which is disclosed a diperoxyacid precursor having the structure

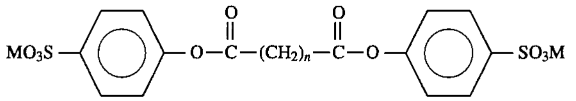

wherein n is an integer from about 4 to about 18 and M is an alkali metal, an alkaline earth metal, or ammonium.

Activators also contain leaving groups which are displaced during perhydrolysis as a result of attack upon the activator by perhydroxide ion from the peroxygen source. An effective leaving group must generally exert an electron-withdrawing effect. This facilitates attack by the peroxide ion and enhances production of the desired peracid. Such groups generally have conjugate acids with pKa values in the range of from about 6 to about 13. These leaving groups may be selected broadly from among enols, carbon acids, N-alkyl quaternary imidazoles, phenols, and the like.

Examples of typical surface active activators coming within this definition include, for example:

(a) Carbonyl materials of the formula

such as disclosed in the U.S. Pat. No. 4,412,934 where R is an alkyl group of up to about 18 carbon atoms and L is a leaving group having a conjugate acid with a pKa in the range of 6 to 13. These types of activators were previously disclosed in U.K. Patent 864,798.

(b) Activators of the general structure

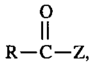

wherein R is an alkyl chain containing about 5 to 13 carbon atoms, and Z is a leaving group selected from enols, carbon acids and imidazoles, as exemplified in U.S. Pat. Nos. 4,283,301 and 4,367,156, both of Diehl.

(c) Alpha-substituted alkyl or alkenyl esters of the general structure

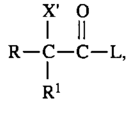

wherein R is a straight or branched alkyl or alkenyl group having from about 4 to 14 carbon atoms, R' is H or $C_2H_5$, X' is Cl, $OCH_3$ or $OC_2H_5$ and L is a leaving group selected from substituted benzenes, amides, carbon acids, imidazoles, enol esters, and sugar esters, exemplified by U.S. Pat. No. 4,483,778 of Thompson et al, and U.S. Pat. No. 4,486,327, of Murphy et al.

(d) Activators of the general structure $[RX]_mAL$, wherein RX is a hydrocarbyl or alkoxylated hydrocarbyl group, preferably $C_{6-20}$ alkyl; X is a heteroatom selected from O, $SO_2$, $N(R')_2$, $P(R')_2$, $(R')P\rightarrow O$ or $(R')N\rightarrow O$;

when m=1, A is

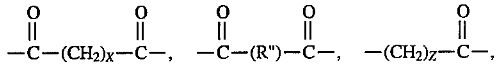

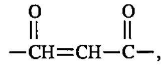

or

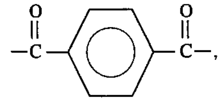

and X is 0 to 4, Z is 0 to 2, (R') is alkyl and R" is branched-chain alkylene;

when m=2, A is

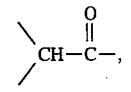

such activators being exemplified in U.S. Pat. No. 4,681,952, of Hardy et al;

(e) Carbonate esters of the general structure

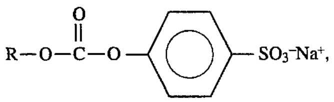

wherein R is $C_{6-10}$ alkyl, such as disclosed in European Published Patent Application EP 202,698 (also apparently disclosed in U.S. Pat. Nos. 3,272,750, of Chase, 3,256,198, of Matzner, and 3,925,234, and 4,003,841, both of Hachmann et al.)

(f) Substituted phenylene mono- and diester activators of the general structure:

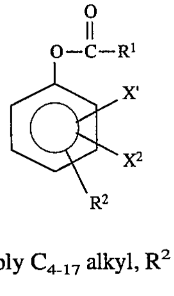

wherein $R^1$ is preferably $C_{4-17}$ alkyl, $R^2$ is OH, —O—$R^3$, or

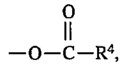

and X', $X^2$, Y and Z are substituents, as exemplified in European Published Patent Application EP 185,522, of common assignment herein.

(g) Alkanoyloxycarboxylate activators of the structure

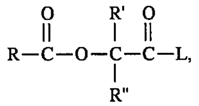

wherein R is $C_{1-20}$ branched or straight chain alkyl, alkoxylated alkyl, cycloalkyl, substituted aryl, alkenyl, aryl, alkylaryl; R' and R" are independently H, $C_{1-4}$ alkyl, aryl, $C_{1-20}$ alkylaryl, substituted aryl, and $NR_3^{4+}$, wherein $R^4$ is $C_{1-30}$ alkyl; and L is a leaving group, as disclosed and claimed in U.S. Pat. No. 4,778,618, of Fong et al, of common assignment herewith.

Each of the foregoing references listed in subparagraphs (a) through (g) above are incorporated herein by reference.

Examples of specific peracid precursors in accordance with these parameters are set forth in the following examples.

A hydrogen peroxide source is preferably selected from the alkali metal salts of percarbonate, perborate, hydrogen peroxide adducts and hydrogen peroxide itself. Most preferred are sodium percarbonate, sodium perborate mono- and tetrahydrate, and hydrogen peroxide.

Where the bleach product is a liquid, it may be necessary to isolate the liquid hydrogen peroxide solution from the precursor prior to use, for example, to prevent premature decomposition. This can be accomplished by dispensing separate streams of fluid containing, respectively, hydrogen peroxide and precursor and other adjuncts via, for example, a multiple liquid dispenser. An example of a dispenser of this type is the "Multiple Liquid Proportional Dispensing Device", disclosed in Beacham et al, U.S. Pat. No. 4,585,150, commonly assigned to The Clorox Company.

Alternatively, an activated bleach product can be delivered without isolating liquid hydrogen peroxide from the precursor as taught in U.S. Pat. No. 4,772,290, of Mitchell et al, of common assignment herewith.

Delayed Acidification or Acid Release Agent

The acidification agent is selected for its ability to develop the lower pH discussed above in connection with FIGS. 3 and 4. At the same time, it is important to select the acidification means or acid agent either to assist in other functions to be carried out during the wash cycle or at least not to interfere with the performance of those functions by other components of the bleach product or other products employed in the wash cycle. Accordingly, the most preferred acids contemplated for carrying out delayed acidification in connection with the present invention include acetic acid, citric acid, boric acid, malonic acid, adipic acid, succinic acid and other acids well known to those skilled in the art.

The acids referred to above are a type suitable for injection directly into the wash solution from an external source as discussed above. For example, the addition of such a simple acid after optimum or maximum peracid generation, results in substantially immediate reduction or lowering of pH as demonstrated for example by the trace 12' in FIG. 4. The addition of such an acid by itself to the bleach product results in lowering of the pH of the wash solution within a very short time period, as represented by the trace 20 in FIG. 4. Addition of the acid by itself thus tends to limit substantial in situ formation of peracid, discussed above as being essential for achieving bleaching action within the wash solution.

Accordingly, the present invention contemplates a delayed acidification means or acid agent which more closely approaches the ideal trace 12 in FIG. 3. Such a trace for a bleach product with delayed acidification according to the present invention is represented in FIG. 4 by a third trace indicated at 30. Rather than achieving the sharp transition between higher and lower pH levels as in the ideal trace 12, the trace 30 represents more gradual transition of a type which is more realistic for a chemical system. At the same time, however, because of the delayed reduction of pH, substantial additional in situ formation of peracid is permitted at the higher initial pH levels so that there is a greater amount of peracid available in the wash solution for carrying out bleaching activities.

As will be demonstrated in the examples below, the third trace 30 represents the addition to an aqueous wash solution of citric acid coated with approximately 10 percent by weight paraffin wax. The paraffin wax in itself provides a delaying function in that it must be first melted or dissolved by the wash water before the acid is effectively released into the aqueous wash solution. By selection of a slower dissolving coating, for example, the curve indicated by the third trace 30 can be further adjusted as necessary or desired to better carry out the objects of the present invention.

In any event, a number of coatings formed from materials representing relatively low solubility rates in water may be employed in combination with one or more of the acids referred to above for providing the delayed acidification means or acid agent of the present invention. Such coatings include, for example, microcrystalline waxes, polyvinyl alcohol, polyacrylic acids, polyvinyl pyrollidones, etc. Other representative coating materials are disclosed in Konda, "Microcapsule Processing and Technology", Marcel Dekker, Inc., NY, N.Y. 1979 and Vandergaer, "Microencapsulation: Process and Application", Plenum Publishing Co., New York 1974.

As indicated above, the delayed acidification agent may be provided in the form of an acid component employed within a bleaching system according to the present invention. In that context, the acid component may be added by mechanical or manual injection or it can take a variety of forms as part of the bleaching product itself. For example, acid sources could include the following:

(a) encapsulated acids;

(b) mechanical means for altering physical characteristics of the acid to control its solubility and rate of release, particularly for acid compounds in dry form; suitable protocols could include pill pressing, mechanical injection, manual injection, solubility adjustment of the acid compound by selected particle size, etc. Additional protocols could include ionic strength adjustment for regulating the rate of dissolution for the acid compound, thus altering characteristics of the acid itself, for example, by modifying a short chain carboxylic acid through the addition of branches or other groups;

(c) a similar protocol would be the blending of the acid compound with a less soluble compound acting as a carrier, for example, clays, zeolite, polymeric resins, etc.

In the following examples, versatility for achieving different solubility rates with one selected acid are demonstrated. The single acid may be combined with different delay means. The acid may also be injected by itself. Other delay means may include a coating for the acid or a prilled form of the acid compound. The acid compound may also be pressed into tablets having a large particle size or reduced surface area to reduce its solubility rate.

Additional mechanical means or compounds or combinations of materials will be obvious from the preceding description for forming the delayed acidification or acid agent of the invention. In addition, the delayed acidification or delayed release acid agent may include other functions. For example, where the delayed release acid agent is formed by a coated acid, additional compounds may be enclosed or encapsulated in the coating along with the acid for further enhancing effectiveness of the acid once it is released into the aqueous solution.

As was further noted above, the delayed acidification or delayed release acid agent also includes an acid precursor system capable of in situ formation of the acid within the aqueous solution generally under time constraints as required by the invention and illustrated above in FIG. 3. For example, one such acid precursor system includes a lipase enzyme and an appropriate acid precursor, such as triacetin or other suitable esters. Other examples of acid precursor systems include acid halides, acid anhydrides, activated organic halides and other materials known to those skilled in the art.

Surfactant or Emulsifer

Surfactants may be useful in the product of the invention for improving cleaning performance, for example, and also possibly for promoting more rapid dispersion of a precursor and/or acid once it is released from a delaying coating or the like.

Nonionic surfactants may be employed for achieving improved cleaning performance, including linear ethoxylated alcohols, such as those sold by Shell Chemical Company under the brand name NEODOL. Other suitable nonionic surfactants include linear ethoxylated alcohols with an average length of from about 6 to 16 carbon atoms and averaging about 2 to 20 moles of ethylene oxide per mole of alcohol; linear and branched, primary and secondary ethoxylated, propoxylated alcohols with an average length of about 6 to 16 carbon atoms and averaging 0–10 moles of ethylene oxide and about 1 to 10 moles of propylene oxide per mole of alcohol; linear and branched alkylphenoxy (polyethoxy) alcohols, otherwise known as ethoxylated alkylphenols with an average chain length of 8 to 16 carbon atoms and averaging 1.5 to 30 moles of ethylene oxide per mole of alcohol; and mixtures thereof.

Further suitable nonionic surfactants include polyoxyethylene carboxylic acid esters, fatty acid glycerol esters, fatty acid and ethoxylated fatty acid alkanolamides, certain block copolymers of propylene oxide and ethylene oxide, and block polymers of propylene oxide and ethylene oxide with propoxylated ethylene diamine. Also included are semipolar nonionic surfactants such as amine oxides, phosphine oxides, sulfoxides, and their ethoxylated derivatives.

Anionic surfactants may also be employed. Examples of such anionic surfactants include the alkali metal and alkaline earth metal sales of $C_6$–$C_{20}$ fatty acids and resin acids, linear and branched alkyl benzene sulfonates, alkyl sulfates, alkyl ether sulfates, alkane sulfonates, olefin sulfonates, hydroxyalkane sulfonates, fatty acid monoglyceride sulfates, alkyl glyceryl ether sulfates, acyl sarcosinates and acyl N-methyltaurides.

Suitable cationic surfactants include the quaternary ammonium compounds in which typically one of the groups linked to the nitrogen atom is a $C_{12}$–$C_{18}$ alkyl group and the other three groups are short chained alkyl groups which may have substituents such as phenyl groups.

Further, suitable amphoteric and zwitterionic surfactants, which may contain an anionic water-solubilizing group, a cationic group and a hydrophobic organic group, include amino carboxylic acids and their salts, amino dicarboxylic acids and their salts, alkylbetaines, alkyl aminopropylbetaines, sulfobetaines, alkyl imidazolinium derivatives, certain quaternary ammonium compounds, certain quaternary phosphonium compounds and certain tertiary sulfonium compounds. Other examples of potentially suitable zwitterionic surfactants can be found in Jones, U.S. Pat. No. 4,005,029, at columns 11–15, which is also incorporated herein by reference as though set forth in its entirety.

Further examples of anionic, nonionic, cationic and amphoteric surfactants which may be suitable for use in this invention are set forth in Kirk-Othmer, *Encyclopedia of Chemical Technology,* Third Edition, Volume 22, pages 347–387, and *McCutcheon's Detergents and Emulsifiers,* North American Edition, 1983, which are also incorporated herein by reference as though set forth in their entireties.

As mentioned above, the surfactants may actually assist during perhydrolysis to disperse or dissolve the precursor allowing more efficient perhydrolysis.

Detergent Adjuncts

As mentioned above, common detergent adjuncts may be added if a bleach or detergent bleach product is desired. In a dry bleach composition, for example, the following ranges (set forth by weight percentages) appear suitable:

| | |
|---|---|
| Hydrogen Peroxide Source | 0.5–50.0% |
| Peracid Precursor | 0.05–75.0% |
| Delayed Acid Agent | 1.0–95.0% |
| Surfactant | 0.1–60.0% |
| Buffer/Builder | 0.1–95.0% |
| Filler, Stabilizers, Dyes, Fragrances, Brighteners, etc. | 0.1–95.0% |

The buffer may be selected from sodium carbonate, sodium bicarbonate, sodium borate, boric acid, sodium silicate, phosphorous acid salts and other alkali metal/alkaline earth metal salts known to those skilled in the art. Organic buffers, such as succinates, maleates and acetates may also be suitable for use. It appears preferable to have sufficient buffer to at least attain the initial alkaline pH level discussed above, for example, with reference to FIG. 3.

The filler material which, in a detergent bleach application, may actually constitute the major constituent of the detergent bleach, is usually sodium sulfate. Sodium chloride is another potential filler. Dyes include anthraquinone and similar blue dyes. Pigments, such as ultramarine blue (UMB) may also be used, and can have a bluing effect by depositing on fabrics washed with a detergent bleach containing the UMB. Monastral colorants may also be included. Brighteners, such as stilbene, styrene and styrylnaphthalene brighteners (fluorescent whitening agents), and fragrances may also be used.

Other standard detergent adjuncts can be included in the present invention. These include enzymes which are especially desirable adjunct materials in detergent products. It may be preferred to include an enzyme stabilizer.

Proteases are one especially preferred class of enzymes. They are selected from acidic, neutral and alkaline proteases. The terms "acidic,""neutral," and "alkaline," refer to the pH at which the enzymes' activity is optimal. Examples of neutral proteases include Milezyme (available from Miles Laboratory) and trypsin, a naturally occurring protease. Alkaline proteases are available from a wide variety of sources, and are typically produced from various microorganisms (e.g., *Bacillis subtilis*). Typical examples of alkaline proteases include Maxatase and Maxacal from International BioSynthetics, Alcalase, Savinase and Esperase, all available from Novo Industri A/S. See also Stanislowski et al., U.S. Pat. No. 4,511,490, incorporated herein by reference.

Further suitable enzymes are amylases, which are carbohydrate-hydrolyzing enzymes. It is also preferred to include mixtures of amalyses and proteases. Suitable amylases include Rapidase, from Societe Rapidase, Milezyme from Miles Laboratory and Maxamyl from International BioSynthetics.

Still other suitable enzymes are cellulases, such as those described in Tai, U.S. Pat. No. 4,479,881, Murata et al, U.S. Pat. No. 4,443,355, Barbesgaard et al, U.S. Pat. No. 4,435,307 and Ohya et al, U.S. Pat. No. 3,983,082, incorporated herein by reference.

Yet other suitable enzymes are lipases, such as those described in Silver, U.S. Pat. No. 3,950,277, and Thom et al, U.S. Pat. No. 4,707,291, incorporated herein by reference.

The hydrolytic enzyme should be present in an amount of about 0.01–5%, more preferably about 0.01–3%, and most preferably about 0.1–2% by weight of the detergent. Mixtures of any of the foregoing hydrolases are desirable, especially protease/amylase blends.

Additionally, optional adjuncts include dyes, such as Monastral blue and anthraquinone dyes (such as those described in Zielske, U.S. Pat. No. 4,661,293, and U.S. Pat. No. 4,746,461).

Pigments, which are also suitable colorants, can be selected, without limitation, from titanium dioxide, ultramarine blue (see also, Chang et al, U.S. Pat. No. 4,708,816), and colored aluminosilicates.

Fluorescent whitening agents are still other desirable adjuncts. These include the stilbene, styrene and naphthalene derivatives, which upon being impinged by ultraviolet light, emit or fluoresce light in the visible wavelength. These FWA's or brighteners are useful for improving the appearance of fabrics which have become dingy through repeated soilings and washings. Preferred FWA's are Tinopal 5BMX-C and Tinopal RBS, both from Ciba Geigy A. G., and Phorwite RKH, from Mobay Chemicals. Examples of suitable FWA's can be found in U.S. Pat. Nos. 1,298,577; 2,076,011; 2,026,054; 2,026,566; 1,393,042; 3,951,960; 4,298,290; 3,993,659; 3,980,713 and 3,627,758; incorporated herein by reference.

Anti-redeposition agents, such as carboxymethylcellulose and polyacrylic acids, are potentially desirable. Next, foam boosters, such as appropriate anionic surfactants, may be appropriate for inclusion herein. Also, in the case of excess foaming resulting from the use of certain surfactants, anti-foaming agents, such as alkylated polysiloxanes, e.g., dimethylpolysiloxane, would be desirable. Fragrances are also desirable adjuncts in these compositions.

The additives may be present in amounts ranging from 0–50%, more preferably 0–30%, and most preferably 0–10%. In certain cases, some of the individual adjuncts may overlap in other categories. However, the present invention contemplates each of the adjuncts as providing discrete performance benefits in their various categories.

In addition, the above components may be combined into a detergent/bleach product where the peracid precursor system components and the delayed acidification or delayed release acid agent, as well as other adjuncts, are combined with a detergent such as those described above.

As was also discussed above, the product including the peracid precursor system and the delayed acidification or acid agent may be combined within a bleach additive for use with Clorox® Detergent from The Clorox Company and conventional detergents such as those available under the trade names TIDE andCheer, registered trademarks of Procter and Gamble, Inc. and ALL, a registered trademark of Lever Brothers, Inc.

Accordingly, a wide variety of products is contemplated by the invention to achieve the advantages referred to above. The manner in which those advantages are achieved is made more apparent in the following examples.

EXAMPLE 1

This example relates to perhydrolysis of a diperoxyacid and stain removal performance of the peracid. In accordance with the present invention, perhydrolysis yield is shown to increase with increasing pH. Stain removal performance of the peracid, on the other hand, is shown to increase with decreasing pH. Thus, this example demonstrates utility of the present invention in maintaining a relatively high or basic pH during perhydrolysis with delayed acid release occurring after substantial formation of the peracid in order to enhance oxidizing or stain removal performance of the peracid, for example, during a wash cycle.

More specifically, perhydrolysis yield in accordance with pH is demonstrated in Table I as set forth below. Perhydrolysis yield is illustrated at three different pH levels of 9.5, 10 and 10.5 for a peracid precursor nominally identified as dodecanedioic-diparaphenylsulfonate and having the structure

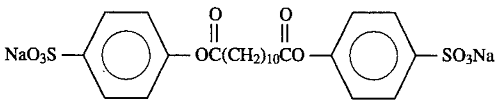

In each of the performance levels set forth in Table I, perhydrolysis is carried out with hydrogen peroxide being present in an aqueous solution at a concentration of $1.75\times10^{-3}$M and a concentration for the precursor of $4.375\times10^{-4}$M and at a temperature of 21° C. The pH level for each of the performance levels in Table I is adjusted, for example, by the addition of varying amounts of acid or base.

The precursor identified above generates a diperoxyacid, namely diperoxydodecanedioic acid, commonly referred to as DPDDA.

TABLE I

PERHYDROLYSIS YIELD OF DIPEROXYDODECANEDIOIC ACID (DPDDA)

| pH | % Peracid Yield |
|---|---|
| 9.5 | 29 |
| 10 | 54 |
| 10.5 | 86 |

Thus, Table I clearly shows increasing yields of peracid with increasing pH levels.

Related Table II demonstrates stain removal performance for the particular peracid formed by perhydrolysis in accordance with Table I. In carrying out tests providing the data of Table II, cotton swatches stained with crystal violet were placed in aqueous solution with varying concentrations of peracid and with the pH adjusted, for example, by addition of an acid. The performance levels of Table II were carried out with peracid concentrations of 7 ppm, 10 ppm and 14 ppm and corresponding pH levels of 8.5, 9.5 and 10.5.

TABLE II

PERCENT STAIN REMOVAL OF CRYSTAL VIOLET ON COTTON SWATCHES

| | pH: | | |
|---|---|---|---|
| Concentration of peracid | 8.5 | 9.5 | 10.5 |
| 7 ppm Active Oxygen | 81.4 | 82.9 | 78.0 |
| 10 ppm Active Oxygen | 87.9 | 85.3 | 82.4 |
| 14 ppm Active Oxygen | 92.4 | 89.2 | 86.8 |

Table II thus clearly demonstrates the improved stain removal or oxidizing capability of the peracid with decreasing or more acidic pH conditions.

The data from Tables I and II, taken together, suggest the utility of the present invention in performing initial perhydrolysis at a relatively high pH level followed by a reduction of the pH level, preferably by delayed acid injection or release, to provide improved oxidation or stain removal. As demonstrated in Table I, perhydrolysis is carried out at a relatively high pH of at least 9.5, more preferably about 10.5 while oxidation or stain removal is carried out at a reduced pH level of no more than about 9.5, more preferably about 8.5.

This example further demonstrates the ability to initially enhance perhydrolysis yield, for example, at a relatively high pH of 10.5 as indicated in Table I, followed by the direct addition of acid in order to reduce the pH level of the solution and thereafter enhance oxidizing or stain removal capabilities of the peracid. For example, the acid component necessarily added to achieve the lower pH levels, such as 8.5 as indicated in Table II, may be achieved by manual addition of the acid component to the aqueous solution when desired, by automatic mechanical injection, etc.

EXAMPLE 2

This example demonstrates one technique of delayed acid release for lowering the pH of an aqueous solution, for example, a wash solution. This example provides different rates of reactivity of various esters which generate acid in situ to reduce the pH of the solution after a predetermined time interval. In the present invention, delayed acid release was achieved by the in situ generation of an acid by chemical hydrolysis of a methyl ester of an acid.

The experimental procedure or protocol for this example involves addition of a commercial detergent such as those noted above to form an aqueous solution having a pH of about 9.8. The initial pH of the aqueous solution may be raised to approximately 10.5 by addition of an appropriate amount of sodium carbonate ($Na_2CO_3$). TIDE® detergent was added in an amount of about 1.287 grams per liter (gm/l) with the sodium carbonate being added in an amount of approximately 0.1 gm/l.

Figure 5:
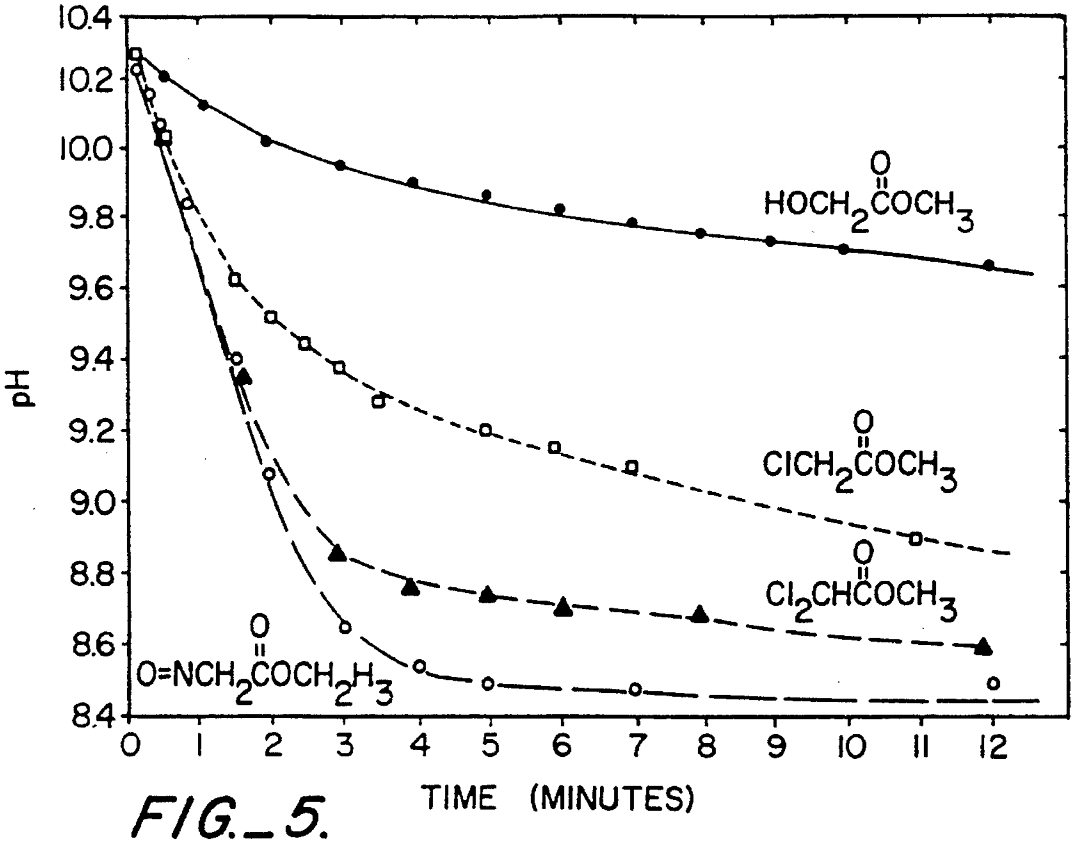
FIG. 5 is a graphical representation of pH adjustment accomplished by addition to aqueous solutions of methyl esters of different acids.

Various acid generating species were added simultaneously to the solution along with the detergent to produce the pH curves illustrated in FIG. 5. The different acid generating species employed in this example each included methyl ester acid with different R substituents including —OH, —Cl, —$Cl_2$ and —$NO_2$. The structures for these various acid generating species have the general formula

O
||
$RCOCH_3$ and are further illustrated below:

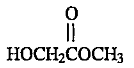
A.

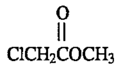
B.

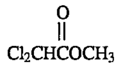
C.

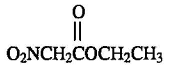
D.

For each of the acid generating species, the aqueous solution was maintained at a temperature of approximately 25° C. The appropriate methyl ester acid species was present at approximately $2.9\times10^{-3}$M.

For each of the acid generating species, hydrolysis of the methyl or ethyl ester provided in situ acid formation according to the equation:

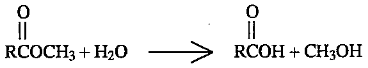

Each ester generated an equivalent of acid. Furthermore, in this example, the ester portion of each acid generating species did not perhydrolyze.

As illustrated in FIG. 5, the hydrolysis rate and hence pH reduction can be controlled by the nature of the R substituent. Selection of the R substituent as an electron withdrawing group such as —Cl or —$NO_2$ lowers the pKa of the parent acid and increases its hydrolysis reaction rate. Longer chain esters tend to be more oil-like or lipophilic and thus less soluble in aqueous solution. The esters employed in this example were all readily water soluble by comparison.

Comparison of the esters listed above and demonstrated in FIG. 5 illustrates that methyl glycolate (A) hydrolyzes relatively slowly. Faster reactivity is observed with the other esters having substituted reactive groups of —Cl, —$Cl_2$ and —$NO_2$.

EXAMPLE 3

Figure 6:
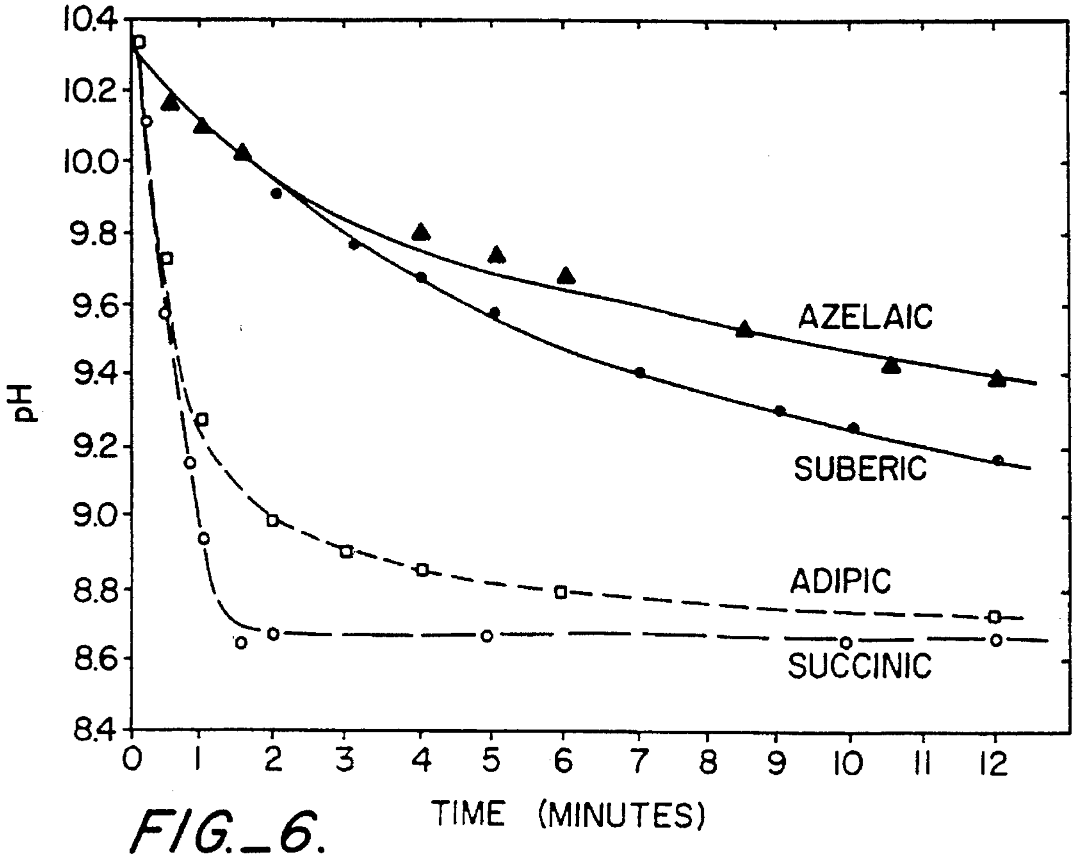
FIG. 6 is a graphical representation of pH adjustment accomplished by addition to aqueous solutions of various aliphatic dicarboxylic acids having different chain lengths.

This example employed the same experimental procedure or protocol as described above in connection with Example 2 while employing organic acids of varying chain lengths to demonstrate their relative effect in controlling solubility of the acid and varying the rate of pH reduction as illustrated in FIG. 6.

Referring to FIG. 6, the same procedure described in Example 2 was carried out but with the addition of approximately $1.45\times10^{-3}$M of an appropriate diacid ($2.9\times10^{-3}$ Normal.)

In FIG. 6, four different traces are illustrated for four different aliphatic dicarboxylic acids including azelaic acid, suberic acid, adipic acid and succinic acid. These four diacids have structures as illustrated immediately below:

Azelaic Acid—$HO_2C(CH_2)_7CO_2H$

Suberic Acid—$HO_2C(CH_2)_6CO_2H$

Adipic Acid—$HO_2C(CH_2)_4CO_2H$

Succinic Acid—$HO_2C(CH_2)_2CO_2H$

This example demonstrates that solubility of the respective diacid and accordingly the pH level of an aqueous solution containing the acid is affected by the chain length of the acid. As noted above, FIG. 6 shows the pH profile for an aqueous solution including each of the diacids disclosed above with the respective diacids being added simultaneously with the detergent component.

The pH level decreases more rapidly with the shorter chain diacids due to greater solubility of the diacid. In these experiments, the diacids were selected as fine powders so that variations in pH level were due to chain length of the respective diacid rather than particle size, for example. It is also noted that concentration could similarly affect the solubility rate and thus the rate of pH change. However, in the present experiments, the acid concentration was identical as noted above, again to assure that the resulting change in solubility and pH variation was a function only of chain length.

Thus, Examples 2 and 3 both demonstrate the principle that physical characteristics of various acids may be selected for the purpose of adjusting their solubility rates and thus controlling the rate of pH change in an aqueous solution containing the respective acids. It will of course be apparent that other physical characteristics of the acids such as particle size, concentration, etc. could also be employed for a similar purpose of regulating the rate of pH change in aqueous solution.

EXAMPLES 4–6

Whereas the above examples related to chemical hydrolysis of various methyl ester species, Example 4–6 demonstrate that enzymatic hydrolysis, more specifically lipase hydrolysis of a triacetin substrate, can be employed as an acid precursor for achieving delayed pH reduction in accordance with the invention. Although a single combination of an enzyme and substrate are disclosed herein, as noted above, it is of course to be understood that other combinations of enzymes and substrates, preferably esters, could similarly be employed for delayed acid generation to achieve the pH reduction in accordance with the invention. In each of Examples 4–6 a combination of glycerol triacetate and a lipase enzyme, specifically Lipase K-10, were added to an aqueous wash solution simultaneously with TIDE detergent, the detergent solution containing 100 ppm hardness, 2 mM sodium bicarbonate $NaHCO_3$ at 100° F. or about 36° C. The glycerol triacetate was obtained from Sigma Chemical Co. and the Lipase K-10 enzyme was obtained from Amano Chemical.

In each of Examples 4–6, the pH level of the solution was determined both initially and at the end of an indicated time interval.

Data for Examples 4–6 are set forth below in Table III.

TABLE III

GLYCEROL TRIACETATE/LIPASE K-10

| Example | T (min) | Glycerol Triacetate (g/l) | Lipase K-10 (g/l) | pH Initial–Final |
|---|---|---|---|---|
| 4 | 40 | 1.0 | 0.1 | 9.8–9.1 |
| 5 | 30 | 2.0 | 0.1 | 9.7–8.7 |
| 6 | 30 | 2.0 | 0.2 | 9.7–8.8 |

The foregoing description, embodiments and examples of the invention have been set forth for purposes of illustration and not for the purpose of restricting the scope of the invention. Other non-limiting embodiments of the invention are possible in addition to those set forth above in the description and examples. Accordingly, the scope of the present invention is defined only by the following claims which are also further illustrative of the invention.

What is claimed is:

1. A method for bleaching fabrics comprising the steps of contacting the fabric in an aqueous solution with a bleaching product comprising a peracid precursor and a source capable of producing hydrogen peroxide in the aqueous solution, the peracid precursor and hydrogen peroxide being present in relative amounts effective for in situ formation of a bleach effective amount of peracid in the aqueous solution, and releasing an acid agent into the aqueous wash solution after a predetermined time period of between one-half minute to five minutes in order to allow formation of at least about 50 percent of the theoretical amount of peracid in the aqueous wash solution, the amount and type of the acid agent being selected for reducing the pH of the aqueous wash solution to a level at least 0.5 units less than the initial pH for enhancing bleach performance of the peracid.

2. The method of claim 1 wherein the predetermined time period is about two to five minutes.

3. The method of claims 1 wherein the predetermined time period is about three to five minutes.

4. A method for bleaching fabrics comprising the steps of contacting the fabric in an aqueous solution with a bleaching product comprising a peracid precursor and a source capable of producing hydrogen peroxide in the aqueous solution, the peracid precursor and hydrogen peroxide being present in relative amounts effective for in situ formation of a bleach effective amount of peracid in the aqueous solution, initially raising the pH of the aqueous wash solution to at least 9.5, the pH level being selected for allowing maximum peracid formation in the wash solution, and after the formation of at least about 50 percent of the theoretical amount of peracid introducing at a second time an acid agent into the aqueous wash solution, the amount and type of acid being selected for reducing the pH of the aqueous wash solution to a level at least 0.5 units less than the initial pH for enhancing bleach performance of the peracid.

5. The method of claim 4 wherein the step of initially raising the pH of the aqueous wash solution is done such that the initial pH of the aqueous wash solution is greater than 9.5 for enhancing formation of the peracid in the aqueous wash solution.

* * * * *